Dec. 23, 1930.    C. C. FARMER    1,786,198
ANGLE COCK DEVICE
Filed July 23, 1927
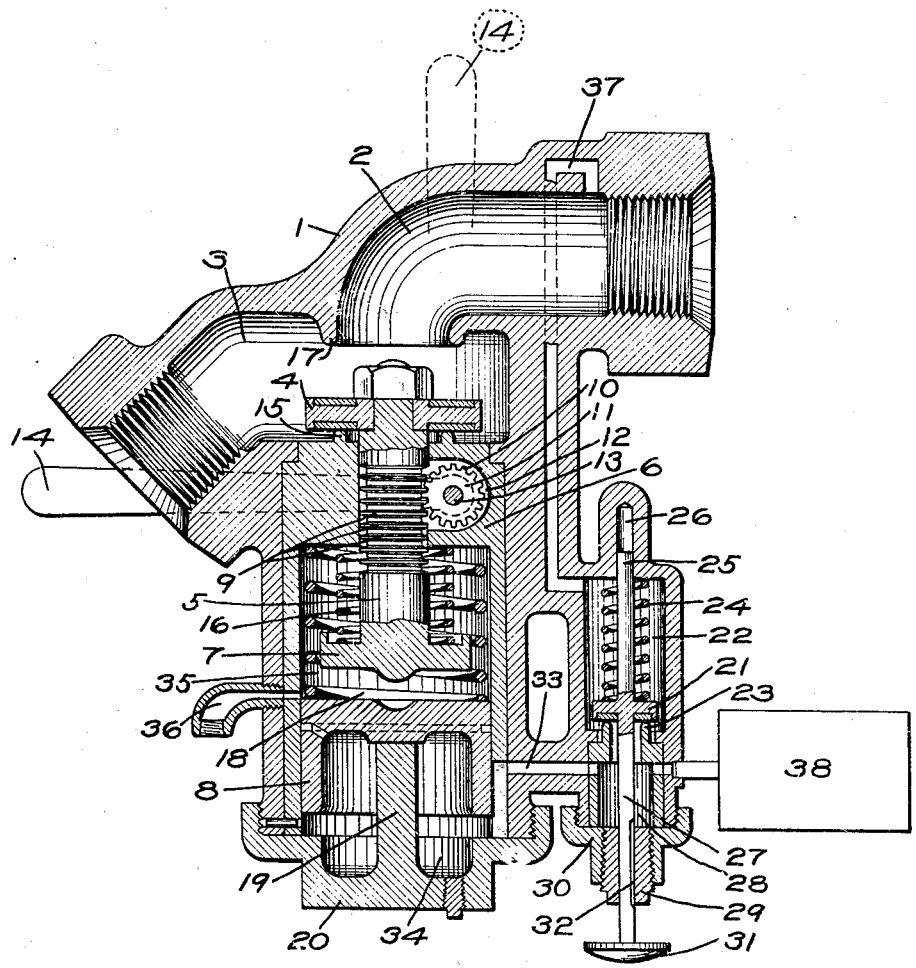
INVENTOR
CLYDE C. FARMER.
BY Wm. H. Cady
ATTORNEY Patented Dec. 23, 1930

1,786,198

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ANGLE-COCK DEVICE

Application filed July 23, 1927. Serial No. 207,845.

This invention relates to fluid pressure brakes and more particularly to angle cock devices such as employed to control communication through the brake pipe of a fluid pressure brake system.

It has been proposed, especially in connection with passenger trains, to eliminate the angle cock devices and to close the open end of the brake pipe, on the rear end of the last car of a train, by means of a dummy hose coupling. This elimination of the angle cock devices was for the purpose of preventing the accidental or malicious closing of the communication through the brake pipe, but it will be seen that when cars, not equipped with angle cock devices, are being switched or made into trains, the brake pipe is consequently disconnected between cars, and fluid under pressure from the brake pipe is completely vented to the atmosphere, so that the brake pipe has to always be recharged and the train brakes released before the train can be moved. To eliminate these objectionable features it has been proposed to use an angle cock device of a type such as is shown and described in an application for United States Letters Patent of Fremont P. Livingston, filed February 2, 1927, Serial No. 165,384, for angle cocks, which angle cock device is adapted to normally maintain open communication through the brake pipe, but having manually operable means whereby communication through the angle cock device may be temporarily closed so as to permit such operation as the disconnecting of the brake pipe between cars, switching of cars and the making up of trains, without loss of fluid under pressure, and which after a limited time will open automatically and establish communication through the brake pipe.

An object of my invention is to provide an angle cock device of the type shown and described in the aforementioned pending application for United States Letters Patent, with means for indicating whether the communication through the angle cock device is open or closed.

As shown in the drawing, the single figure is a central sectional view of an angle cock device embodying my invention.

In the drawing, an angle cock device has been illustrated which is similar in construction to the one shown and described in the aforementioned pending application for United States Letters Patent, and may comprise an angle fitting 1, having a passage 2 adapted to be connected to the brake pipe proper, and a passage 3 adapted to be connected to the usual flexible hose.

For controlling communication between the passages 2 and 3 there is provided a double seating valve 4 and secured to this valve there is a stem 5, one end of which extends through an opening formed in the end wall of a bushing 6 mounted in the fitting 1, and at its other end is provided with a collar 7 which is adapted to be engaged by a piston 8 also operatively mounted in the bushing 6.

Intermediate the valve 4 and the collar 7, the stem 5 is provided with a plurality of teeth 9 which are adapted to mesh with the teeth 10 of a gear wheel 11 located in a recess 12 formed in the end wall of the bushing 6, such gear wheel being secured to a shaft 13 suitably journalled in the bushing and the fitting 1. The outer end portion of this shaft extends through the wall of the fitting and is provided with an indicating arm 14, the purpose of which is to indicate whether the communication through the fitting is open or closed, in other words, to indicate whether the valve 4 is in its open or closed position.

The double seating valve 4 in one position is adapted to seal against a seat ring 15 formed on the bushing 6 and is yieldingly held in such position by a spring 16 interposed between the collar 7 and the end wall of the bushing 6. This valve in its other position is adapted to seal against a seat ring 17 formed on the fitting 1, and in this position, is adapted to close communication between the passages 2 and 3. When the valve 4 is in its open position, as shown in the drawing, the indicating arm 14 will be in a horizontal position, and upon movement of the valve from this position to its closed position, the shaft 13 will, due to the engagement between the teeth on the stem 5 and the teeth on the gear wheel 11, be rotated and cause the indicating arm to move to a vertical position, as shown by the dotted lines in the drawing.

The piston 8, mounted in the bushing 6, is subject to the pressure of a spring 18 and is limited in its downward movement by its engagement with a stop 19 on a cap nut 20, secured to the fitting 1. This piston is adapted to travel upward a predetermined distance before it engages the collar 7 on the stem 5.

Incorporated in the angle cock device is a valve 21, contained in a chamber 22, and adapted to be normally held seated against a seat ring 23 by the pressure of a spring 24. The valve 21, at one side is provided with a stem 25 which, for the purpose of guiding the valve, is slidably mounted in a bore 26 in the fitting. At the opposite side this valve is provided with a stem 27 which extends through a chamber 28 and adjacent its outer end is slidably mounted in a plug 29, having screw-threaded engagement with a cap nut 30 secured to the fitting. At its outer end, outside of the fitting, this latter stem is provided with a push button 31, through the medium of which the valve 21 is adapted to be operated in one direction. The stem 27 is provided with a longitudinal groove 32 which, when the valve 21 is seated as shown in the drawing, will connect the chamber 28 with the atmosphere, and as this chamber is connected by a passage 33, with a chamber 34 at one side of the piston 8, this latter chamber will also be vented to the atmosphere, so that the spring 18, in the chamber 35 at the opposite side of the piston 8, will hold such piston in engagement with the stop 19, in which position of the piston, the chamber 35 will be connected with the atmosphere through a port and passage 36. The valve 21, when in its seated position, closes communication between the chambers 22 and 28, so that fluid under pressure flowing from the passage 2, through a passage 37 to the chamber 22, cannot flow to the chamber 28.

Assuming that the hose couplings of two cars equipped with my invention are operatively connected together, the several parts of each of the angle cock devices will be in the positions as shown in the drawing, and the indicating arm 14 will be in its horizontal position, as shown in full lines in the drawing. If it is desired to uncouple these two hose couplings, the operator can readily see, by the position of the arm 14, that the valve 4 is in its open position and that, before uncoupling the hose couplings, he must close the communication through the fitting. He therefore forces the push button 31 upwardly, which causes the valve 21 to operate to open communication between the chambers 22 and 28. Chamber 22 being connected with passage 2, through the passage 37, fluid at brake pipe pressure flows from the chamber 22 past the open valve 21 to the chamber 28 and from thence flows through passage 33 to the piston chamber 34 when pressure builds up and causes the piston 8 to move upwardly against the pressure of the spring 18. As the piston is thus moved, it engages the collar 7 of the stem 5 and shifts the double seating valve 4 into engagement with the seat ring 17, thus closing communication between the passages 2 and 3. As the stem 5 is moved upwardly, the shaft 13 and indicating arm 14 will, due to the meshing of the teeth 9 and 10 of the stem 5 and gear wheel 11, respectively, be rotated until such time as the valve 4 seals against the seat ring 17, at which time the indicating arm 14 will be in its vertical position, as shown in dotted lines in the drawing, and the operator can see that valve 4 is in its proper position to close the communication through the angle cock device and that he may now release the push button 31. When the push button is released, the spring 24 will cause the valve 21 to again seal on the seat ring 23 and at the same time the slot 32, in the valve stem 27, will again connect the chamber 28 with the atmosphere so that fluid under pressure in the chambers 28 and 34 is slowly vented through this slot to the atmosphere. If it should be desired to increase the time required to vent the fluid under pressure acting upon the piston 8, a volume reservoir 38 may be connected with the chamber 28, so that the pressure in this reservoir, as well as in the chambers 28 and 34, must be reduced before the piston 8 is permitted to move downwardly. When the pressure acting upon the piston 8 has been reduced to a predetermined degree, the pressure of the spring 18 forces the piston 8 downwardly so that the fluid at brake pipe pressure in the passage 2 acting on the valve 4, inside the seat ring 17, together with the pressure of the spring 16 acting upon the collar 7 of the stem 5, causes the valve 4 to shift from its closed position to its open position, and as the stem 5 moves with it, the shaft 13 and indicating arm 14 will, due to the meshing of the teeth 9 and 10 of the stem 5 and gear wheel 11, respectively, be rotated so that the arm will be in its horizontal position when the valve 4 is in its open position.

Instead of using an arm 14 to indicate whether the communication through the angle cock device is open or closed, any other suitable means may be employed whereby the operator may perceive whether the communication is open or closed.

In the foregoing description one form of angle cock device has been described, but it will be understood that my invention may be embodied in any other suitable angle cock device when an indicating means is needed to indicate whether the communication through such device is open or closed.

Having now described my invention, what I claim as new and desire to secure by Letters Patent, is:—

1. A train pipe angle cock device having a conduit for the flow of fluid under pressure, means for controlling communication through said conduit, and means operable upon the operation of the first mentioned means for indicating visibly the degree of control of the communication through said conduit.

2. A train pipe angle cock device having a conduit for the flow of fluid under pressure, means for opening and closing communication through said conduit, and means operated automatically for indicating visibly the position of the first mentioned means.

3. A train pipe angle cock device having a conduit for the flow of fluid under pressure, means for opening and closing communication through said conduit, and automatically operated means for indicating visibly whether the communication through said conduit is open or closed.

4. A train pipe angle cock device having a conduit for the flow of fluid under pressure, valve means for opening and closing communication through said conduit, and means operated by the first mentioned means for indicating visibly the position of the first mentioned means.

5. A train pipe angle cock device having a conduit for the flow of fluid under pressure, reciprocative valve means for controlling communication through said conduit, said valve means comprising a valve and a valve stem, a shaft operatively connected with said stem, and means operable by said shaft for indicating the position of said valve.

6. A train pipe angle cock device having a conduit for the flow of fluid under pressure, reciprocative means for opening and closing the communication through said conduit, and means controlled by said reciprocative means for indicating whether said communication is open or closed.

7. A train pipe angle cock device having a conduit for the flow of fluid under pressure, valve means for controlling communication through said conduit, manually operative means for effecting the operation of said valve means to close said communication, said valve means being operative upon the release of said manually operative means to open communiction through said conduit, and means automatically operated to indicate the position of said valve means.

8. A train pipe angle cock device having a conduit for the flow of fluid under pressure, a vertically movable valve subject to the pressure of fluid for controlling communication through said conduit, and means operated upon the operation of said valve for indicating the control position of said valve.

In testimony whereof I have hereunto set my hand.

CLYDE C. FARMER.